(12) United States Patent
Adachi et al.

(10) Patent No.: US 7,967,453 B2
(45) Date of Patent: Jun. 28, 2011

(54) HOLDING STRUCTURE FOR HOLDING A MEMBER IN AN EXTERNAL CABINET

(75) Inventors: Takaharu Adachi, Higashiosaka (JP); Shinichi Okuno, Hirakata (JP); Ryuhei Amano, Hirakata (JP); Takashi Ikeda, Higashiosaka (JP); Takashi Miwa, Higashiosaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 503 days.

(21) Appl. No.: 12/073,297

(22) Filed: Mar. 4, 2008

(65) Prior Publication Data

US 2008/0218037 A1  Sep. 11, 2008

(30) Foreign Application Priority Data

Mar. 6, 2007  (JP) .................. 2007-055979
Aug. 7, 2007  (JP) .................. 2007-205982

(51) Int. Cl.
*G03B 21/14*  (2006.01)

(52) U.S. Cl. ....................................... 353/119; 353/100

(58) Field of Classification Search ................... 353/119, 353/100, 101
See application file for complete search history.

(56) References Cited

U.S. PATENT DOCUMENTS

| 5,111,362 | A * | 5/1992 | Flamm et al. ................ 361/736 |
| 6,173,064 | B1 * | 1/2001 | Anagnos ....................... 381/353 |
| 6,811,266 | B2 * | 11/2004 | Lung et al. .................... 353/101 |
| 6,816,381 | B2 * | 11/2004 | Takeuchi ....................... 361/752 |
| 2003/0148661 | A1 * | 8/2003 | Raypole et al. ................ 439/587 |
| 2007/0008506 | A1 * | 1/2007 | Meng et al. ................... 353/119 |

FOREIGN PATENT DOCUMENTS

| JP | 5-100312 A | 4/1993 |
| JP | 7-287204 A | 10/1995 |
| JP | 2004-258620 A | 9/2004 |

* cited by examiner

*Primary Examiner* — Thanh X Luu
(74) *Attorney, Agent, or Firm* — Westerman, Hattori, Daniels & Adrian, LLP

(57) ABSTRACT

A member to be held is held in an external cabinet having a combination of a first cabinet and a second cabinet. A first supporting section is provided in the first cabinet and a second supporting section is provided in the second cabinet. A section to be sandwiched is provided in the member to be held, and the member to be held is held in the external cabinet by sandwiching this section to be sandwiched by the first supporting section and the second supporting section.

7 Claims, 12 Drawing Sheets

HOLDING STRUCTURE FOR HOLDING A MEMBER IN AN EXTERNAL CABINET

This application claims priority under 35 U.S.C. Section 119 of Japanese Patent Application No. 2007-055979 filed Mar. 6, 2007, entitled "PROJECTION DISPLAY DEVICE" and Japanese Patent Application No. 2007-205982 filed Aug. 7, 2007, entitled "HOLDING STRUCTURE AND PROJECTION DISPLAY DEVICE".

BACKGROUND OF THE INVENTION

1. Field of the Invention

The present invention relates to a holding structure for holding a member to be held in an external cabinet comprising a combination of a first cabinet and a second cabinet. In addition, the present invention relates to a projection display device for enlarging and projecting an image on a display element on a projection plane.

2. Description of the Related Art

Projection display devices (hereafter, referred to as "projectors") for enlarging and projecting an image on a display element (liquid crystal panel, or the like) on a projection plane (screen, or the like) have been commercialized and widely used. In the projectors of this sort, it is desirable to reduce a distance between the screen and the projector body.

To attain this, an arrangement for oblique projection may be used in which a projection optical system is wide-angled, and at the same time, a direction of projection light traveling is oblique to an optical axis of the projection optical system. For example, when a wide-angle lens with a large view angle is used as the projection optical system, and a display element and a screen are shifted in opposite directions to each other with regard to the optical axis of the projection optical system, a projection distance is shortened, and at the same time, oblique projection without distortion can be achieved. However, with the arrangement as mentioned, a wider-angle lens with a larger view angle is necessary, and therefore, increased costs due to a large-sized lens and a large-sized projector body pose a problem.

On the other hand, for realization of the reduced projection distance, such an arrangement is also considered that a projection lens section and a mirror are used as a projection optical system, an image on a display element is formed as an intermediate image between the projection lens section and the mirror, and the intermediate image is then enlarged and projected by the mirror.

In general, the projector of this type is designed to have such an arrangement that a projection lens unit and a mirror are mounted in a housing, and the housing is held in an external cabinet. In this case, one idea is to use a structure for holding an optical engine as a structure for holding the housing. In general, in the structure for holding the optical engine, a spacer is attached to a bottom face of a chassis, the optical engine that is a member to be held is placed on the spacer via an elastic bush, and the optical engine is threaded to the spacer from the above. With this holding structure, it is designed that the optical engine is held only by the bottom face of the chassis via the elastic bush and spacer. That is, the optical engine is held by a so-called planar structure.

However, the projection optical system where the projection lens unit and the mirror are mounted in the housing is far heavier as compared to the optical engine. Therefore, when such as projection optical system, i.e., a heavier member to be held, is held by the holding structure of the above-mentioned optical engine, and when an impact is applied to the projection optical system, deformation in the bottom face of the external cabinet for holding the projection optical system might be caused.

SUMMARY OF THE INVENTION

A holding structure according to a primary aspect of the present invention is a holding structure for holding a member to be held in an external cabinet having a combination of a first cabinet and a second cabinet, and the holding structure comprises a first supporting section provided in the first cabinet, a second supporting section provided in the second cabinet, a section to be sandwiched provided to the member to be held, wherein the member to be held is held by sandwiching the section to be sandwiched by the first supporting section and the second supporting section.

In addition, a projection display device according to the primary aspect of the present invention is a projection display device that holds the projection optical system for enlarging and projecting light modulated depending on an image signal on a projection plane in the external cabinet having the combination of the first cabinet and the second cabinet, and the projection display device comprises a first supporting section provided in the first cabinet, a second supporting section provided in the second cabinet, a section to be sandwiched provided in the projection optical system, wherein the projection optical system is held in the external cabinet by sandwiching the section to be sandwiched by the first supporting section and the second supporting section.

BRIEF DESCRIPTION OF THE DRAWINGS

The foregoing and other objects and novel features of the present invention will be more fully understood by reading a description of preferred embodiments below with reference to the accompanying drawings as follows.

Figure 1:
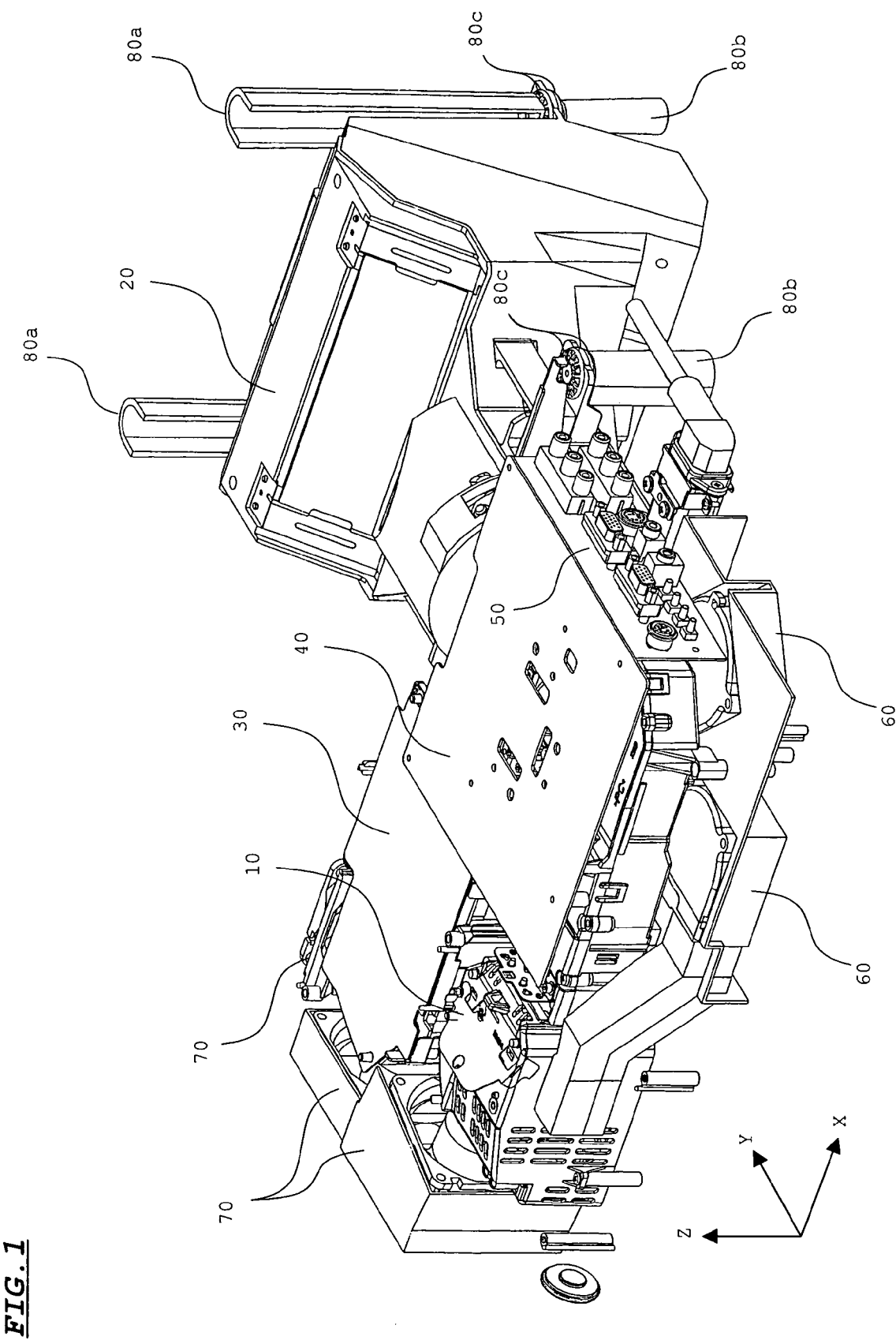
FIG. 1 is a diagram (perspective view) illustrating an arrangement of the projector according to an embodiment.

The drawings are merely intended for illustration and do not set any limits to the scope of the present invention.

DESCRIPTION OF THE PREFERRED EMBODIMENTS

Hereinafter, referring to the drawings, an arrangement of a projector according to the embodiment will be described.

Figure 8:
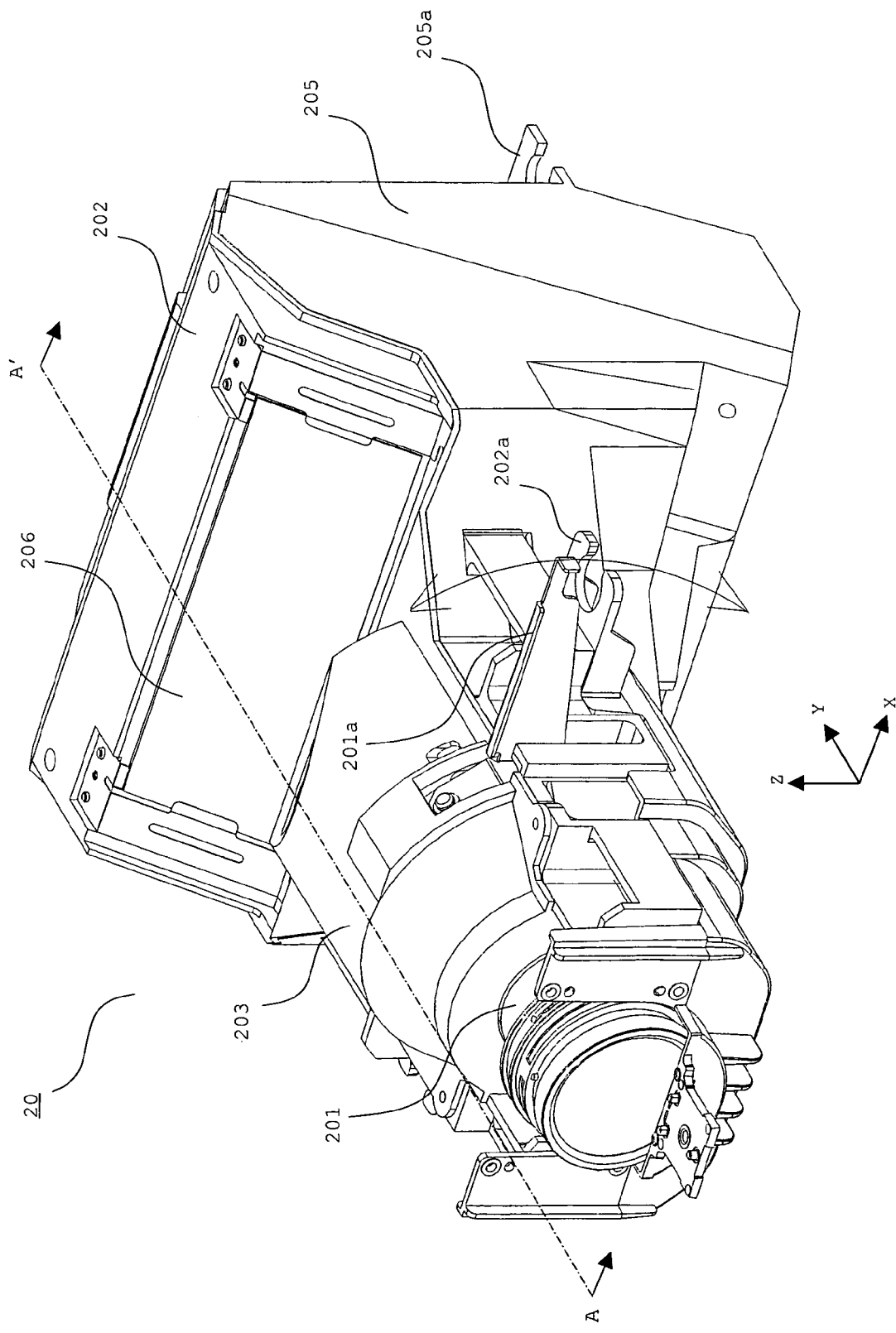
FIG. 8 is a diagram (perspective view) illustrating an arrangement of a projection optical system according to the embodiment.
Figure 9:
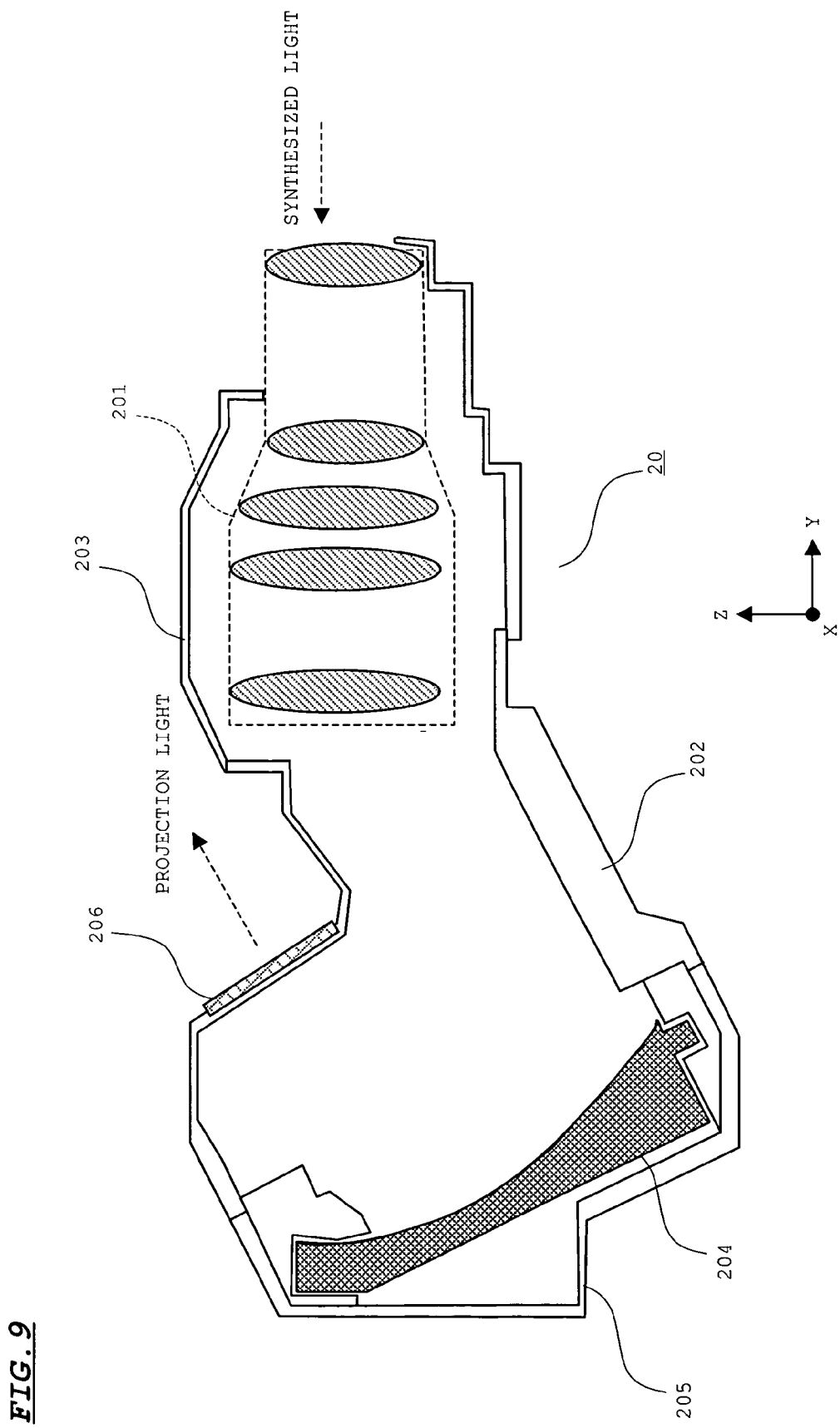
FIG. 9 is a diagram (cross-sectional view) illustrating the arrangement of the projection optical system according to the embodiment.

FIG. 1 through FIG. 7 illustrate the projector in which an external cabinet is omitted. FIG. 1 is a perspective view of the projector showing an external appearance, and FIG. 2, FIG. 3, FIG. 4, FIG. 5, FIG. 6 and FIG. 7 are respectively a top plan view, a bottom plan view, a right side view, a left side view, a front view, and a back view. FIG. 2 through FIG. 7 show the projector in a state that a main substrate 40 is removed. FIG. 8 and FIG. 9 are respectively a perspective view and a cross-sectional view (schematic view) of a projection optical system showing an external appearance.

Referring now to FIG. 1 through FIG. 7, the projector comprises an optical engine 10, a projection optical system 20, a power supply unit 30, a main substrate 40, an AV terminal section 50, a suction fan 60, an exhaust fan 70, and an AC inlet 90. Reference number 80a is a boss from a top face side of the cabinet, reference numeral 80b is a boss from a bottom face side of the cabinet, and reference numeral 80c is a bush for vibration absorption.

Figure 2:
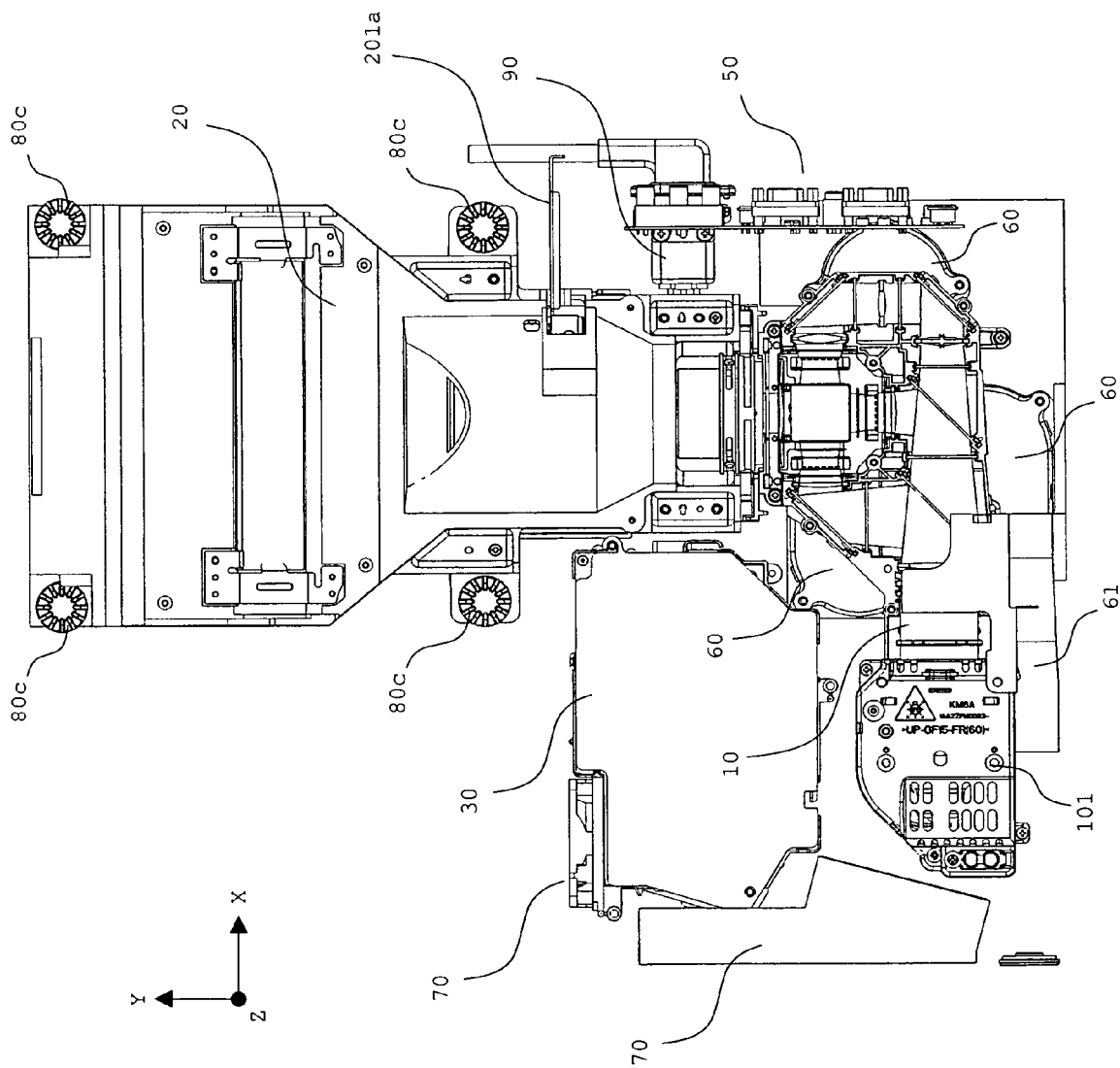
FIG. 2 is a diagram (top plan view) illustrating the arrangement of the projector according to the embodiment.
Figure 3:
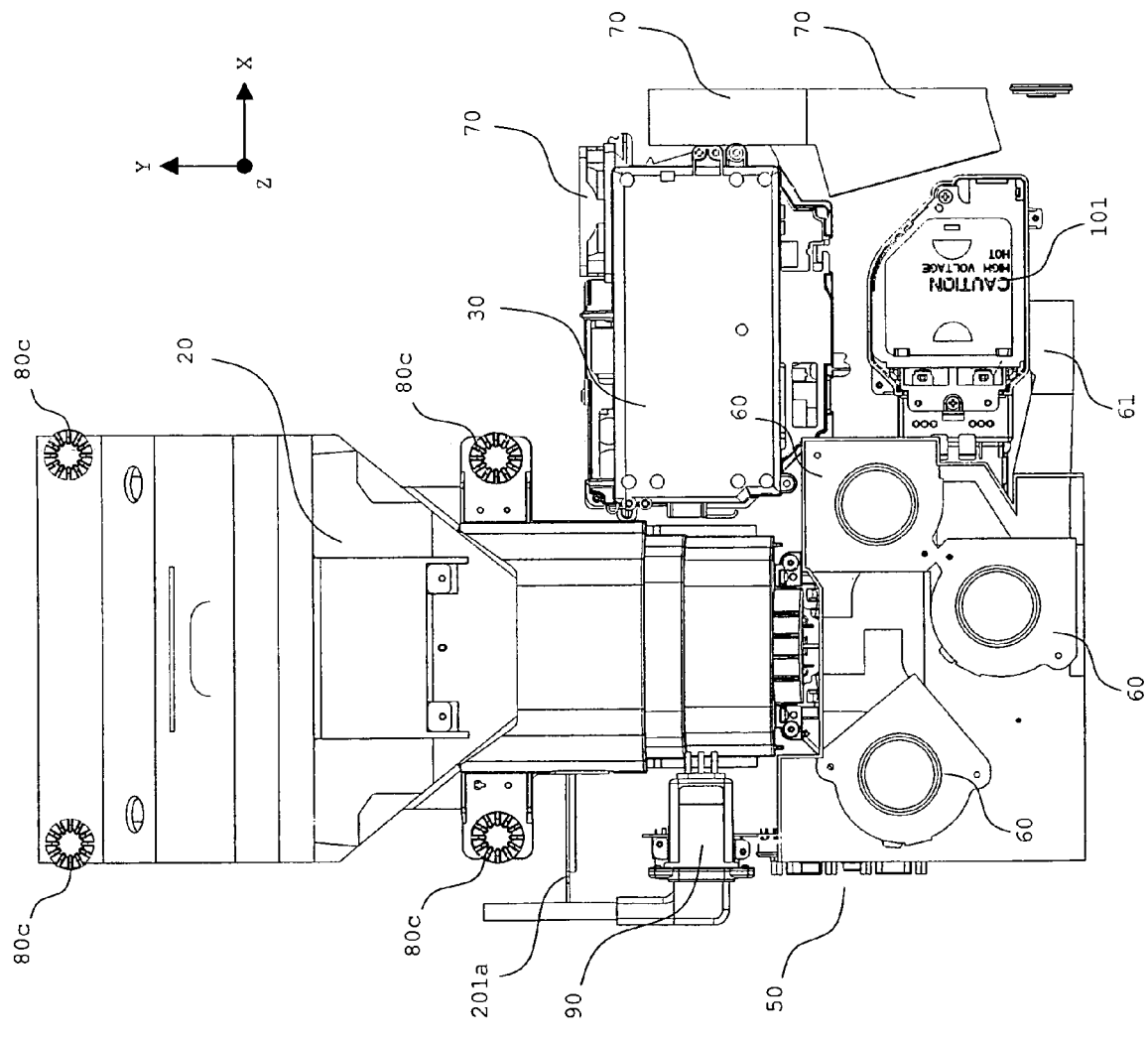
FIG. 3 is a diagram (bottom plan view) illustrating the arrangement of the projector according to the embodiment.

In the projection optical system 20, plate-like sections 202a and 205a shown in FIG. 8 are sandwiched between the bosses 80a and 80b via two bushes 80c as shown in FIG. 1, FIG. 2, and FIG. 3 to be mounted in the cabinet. Since the projection optical system 20 is sandwiched via the bush 80c for vibration absorption, shock is hardly conveyed to the projection optical system 20. The projection optical system 20 is supported by the boss 80a from the top face side of the cabinet and the boss 80b from the bottom face side of the cabinet via the bush 80c for vibration absorption, thereby improving supporting strength.

The optical engine 10 separates white light from a light source 101 into light in a blue wavelength band, light in a green wavelength band, and light in a red wavelength band, and at the same time, modulates the light in respective wavelength bands by a corresponding display element (liquid crystal panel). Furthermore, the optical engine 10 executes color synthesis of the modulated light in the respective wavelength bands by a dichroic prism, and emits the synthesized light to the projection optical system 20. As shown in FIG. 2, the light source 101 is disposed so as to illuminate the light in a direction of an X-axis. Furthermore, the projection optical system 20 is disposed so that the optical axis may be positioned in a direction of a Y-axis. An arrangement of the optical engine 10 and a positional relationship between the optical engine 10 and the projection optical system 20 will be described later, referring to FIG. 10.

The power supply unit 30 supplies electric power to the light source 101 and a main circuit 40. AC voltage is input to the power supply unit 30 via an AC inlet 90. The main circuit 40 is a circuit for driving and controlling the projector. As shown in FIG. 1, a circuit substrate for holding the main circuit 40 is disposed on the top face of the optical engine 10 to cover a part of the optical engine 10. Furthermore, an AV (Audio Visual) signal is input to the main circuit 40 via the AV terminal section 50.

Figure 5:
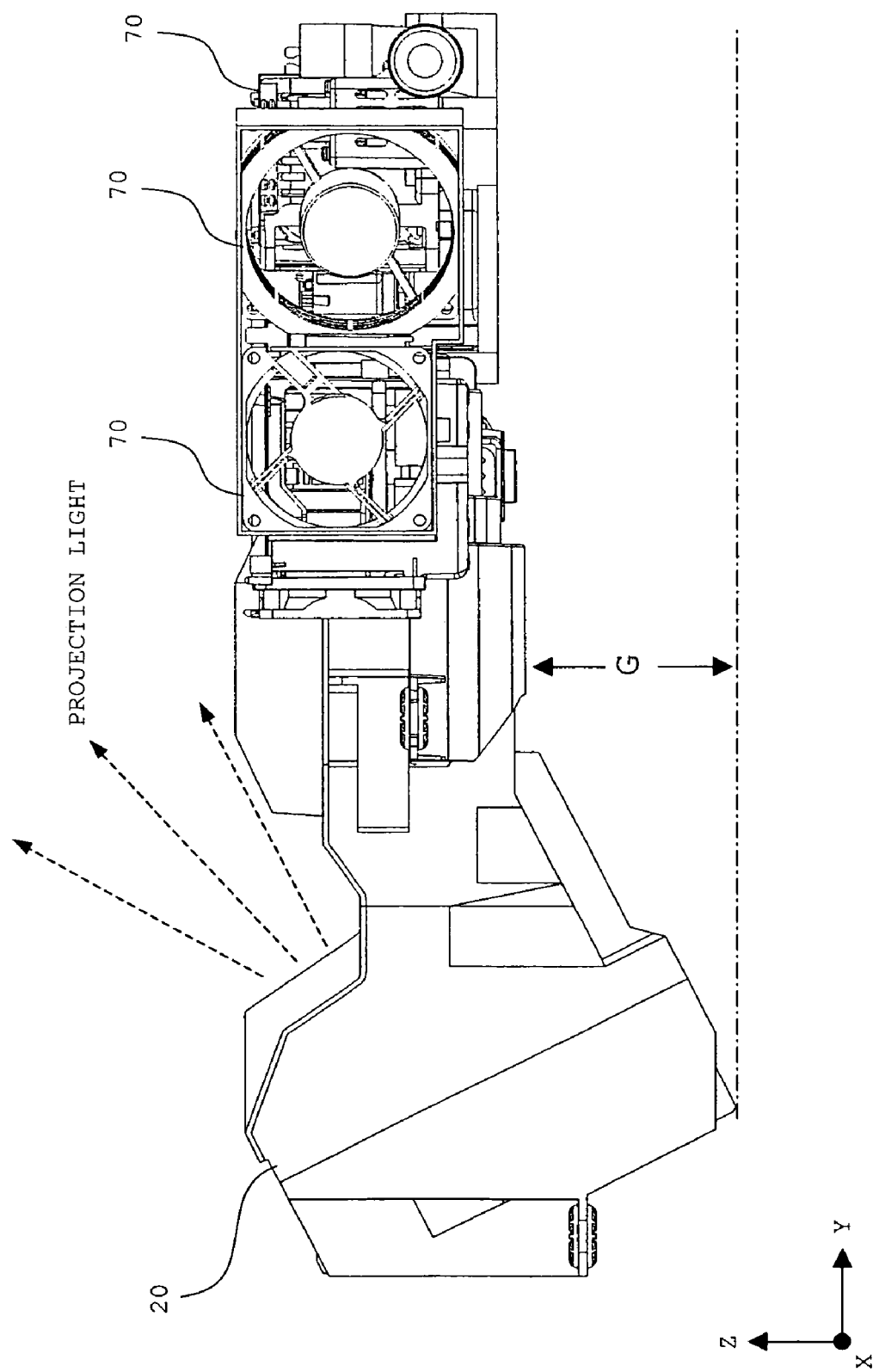
FIG. 5 is a diagram (left side view) illustrating the arrangement of the projector according to the embodiment.
Figure 6:
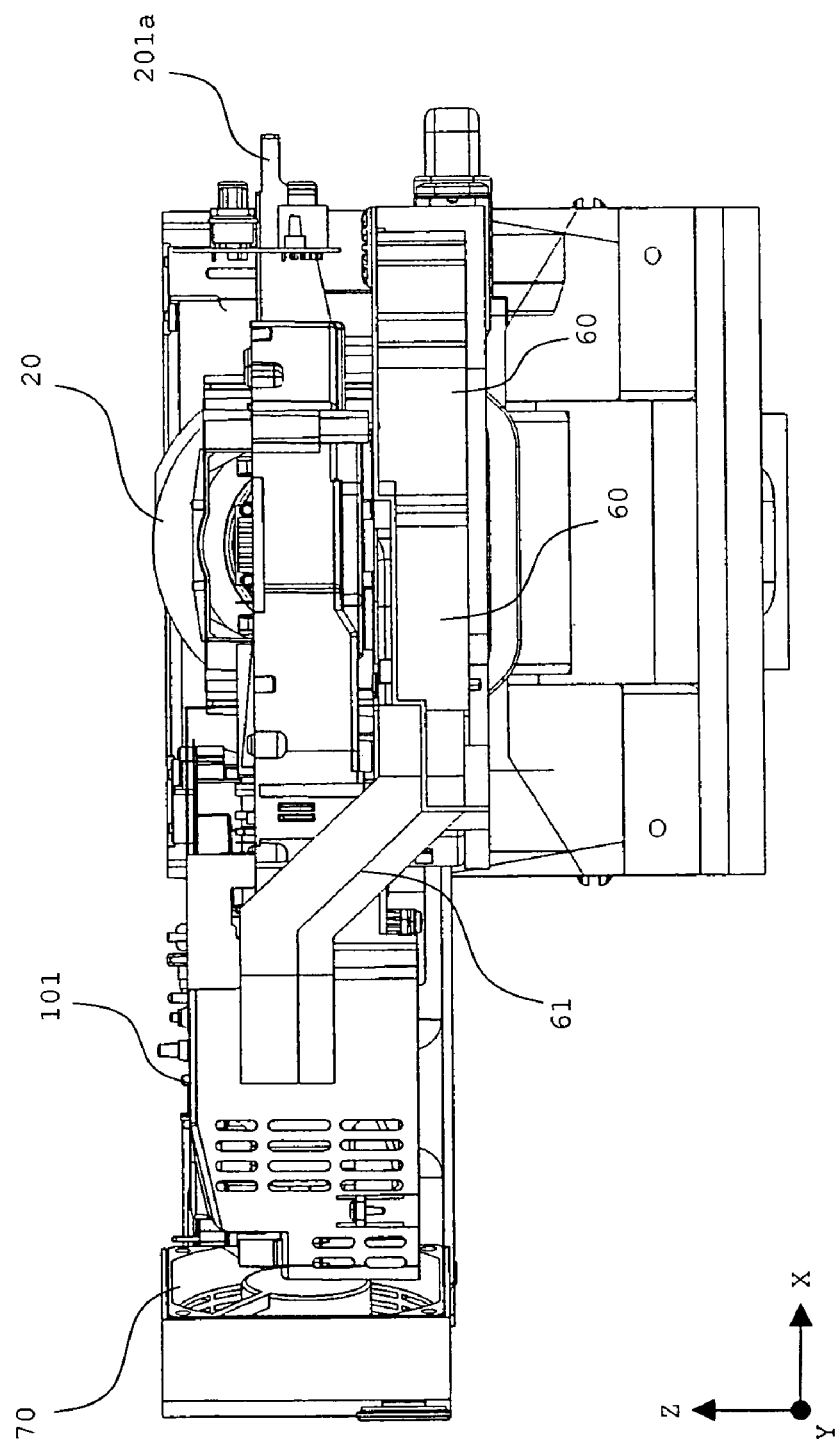
FIG. 6 is a diagram (front view) illustrating the arrangement of the projector according to the embodiment.
Figure 7:
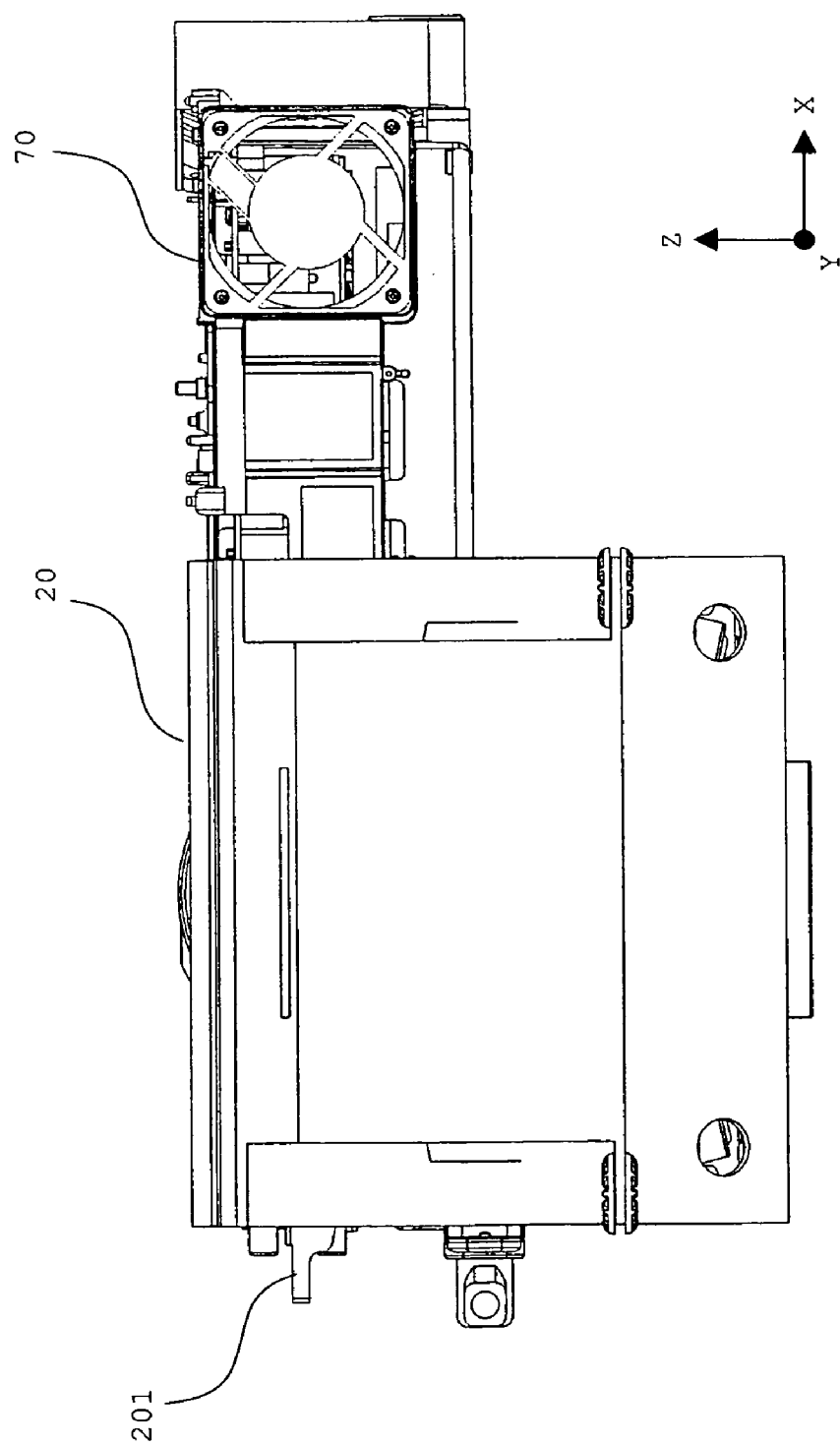
FIG. 7 is a diagram (back view) illustrating the arrangement of the projector according to the embodiment.

As shown in FIG. 1 and FIG. 3, three suction fans 60 are disposed on the bottom face side of the optical engine 10. Air sucked by these suction fans 60 is exhausted by an exhaust fan 70 (see FIG. 5) disposed on a left side surface of the optical engine 10 and an exhaust fan 70 (see FIG. 7) disposed on a rear surface of the optical engine 10. Disposition of the suction fans 60 and exhaust fans 70 as mentioned above allows the air sucked by the suction fan 60 to flow passing through an optical system of the optical engine 10, the light source 101, and the power supply unit 30. Furthermore, as shown in FIG. 2, FIG. 3, and FIG. 6, the sucked air is guided to a side surface of the light source 101 via a duct 61 and flows from the side surface of the light source 101 to the exhaust fan 70. Such air flow removes heat generated in these members.

FIG. 8 and FIG. 9 are respectively a perspective view and a cross-sectional view of the projection optical system showing the external appearance. FIG. 9 schematically illustrates an A-A' section in FIG. 8.

In FIG. 8 and FIG. 9, reference number 201 denotes a projection lens unit, reference number 202 denotes a housing, reference number 203 denotes a dust cover, reference number 204 denotes a reflection mirror, reference number 205 denotes a mirror cover, and reference number 206 denotes a light beam passing window.

The projection lens unit 201 comprises a group of lenses for image formation of the projection light onto an intermediate image formation plane, and an actuator for adjusting a focus state of the projected image by displacing a part of the group of lenses in a direction of an optical axis. Here, focus adjustment of the projection lens unit 201 is carried out by rotating a lever 201a around the optical axis of the projection lens unit 201. As shown in FIG. 8, the lever 201a is disposed to protrude from a side surface of the projection lens unit 201 without blocking the projection light from the light beam passing window 206.

The reflection mirror 204 has a reflection plane having an aspheric shape, widens an angle of the projection light entered from the projection lens unit 201, and projects it from the light beam passing window 206 to a projection plane (screen).

The projection lens unit 201 is accommodated in the housing 202, and further, is covered by the dust cover 203. The reflection mirror 204 is attached to the housing 202 and is also covered by the mirror cover 205.

As shown in FIG. 9, synthesized light generated by the optical engine 10 is entered to the projection lens unit 201 at a position spaced from the optical axis of the projection lens unit 201 in a direction of a Z-axis. The synthesized light entered as mentioned is subjected to a lens action by the projection lens unit 201 and is entered to the reflection mirror 204. Following this, the angle of the synthesized light is widened by the reflection mirror 204 and is projected on the projection plane (screen) via the light beam passing window 206.

Figure 4:
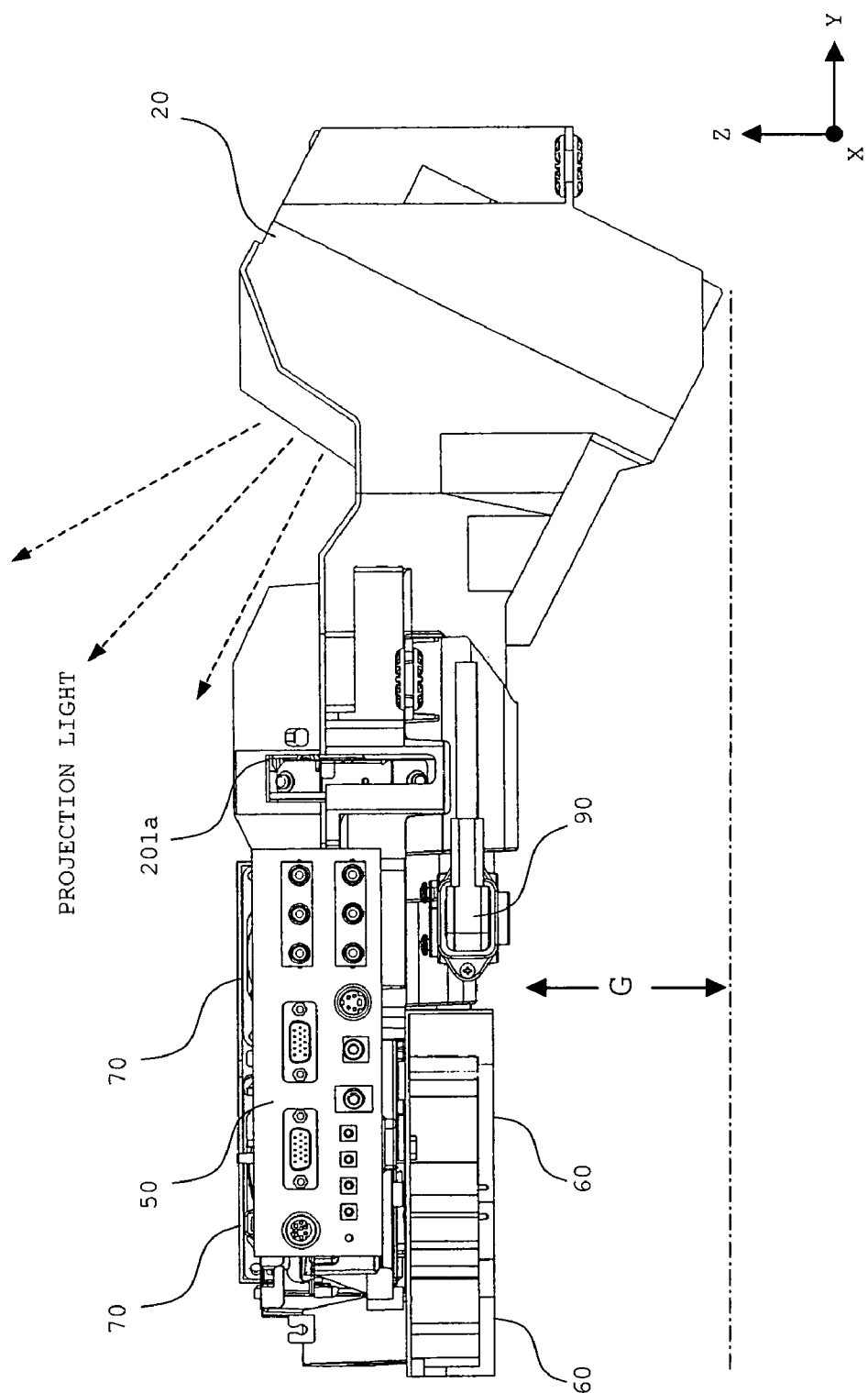
FIG. 4 is a diagram (right side view) illustrating the arrangement of the projector according to the embodiment.

As mentioned above, the synthesized light from the optical engine 10 is entered to the projection lens unit 201 at the position shifted from the optical axis of the projection lens unit 201 in the direction of the Z-axis. Therefore, the reflection mirror 204 is disposed to be shifted from the optical axis of the projection lens unit 201 in the direction opposite to the direction of the synthesized light being shifted, as shown in FIG. 9. Here, since the reflection mirror 204 has a larger reflection plane than a lens surface of each of the lenses constituting the projection lens unit 201, an amount of shifting the reflection mirror 204 with regard to the optical axis of the projection lens unit 201 becomes comparatively larger. For this reason, a comparatively large space G is created on the bottom face side of the projector as shown in FIG. 4 and FIG. 5.

Next, referring to FIG. 10, a principal arrangement of the optical engine 10 will be described.

The light source 101 comprises a burner and a reflector and emits approximately parallel light to an illumination optical system 102. The light source 101 includes, for example, an extra high pressure mercury lamp. The illumination optical system 102 comprises a fly-eye integrator, a PBS (polarization beam splitter) array and a condenser lens. The illumination optical system 102 uniformizes distribution of light quantity of the light of the respective colors when the light are entered to the display elements (liquid crystal panels) 106, 109, and 115, and arranges a direction of polarization of the light traveling to a dichroic mirror 103 in one direction. The light source 101 may be a single light type equipped with only one lamp comprising a burner and a reflector, or a multiple light type equipped with a plurality of lamps.

The dichroic mirror 103 reflects only the light in the blue wavelength band (hereafter, referred to as "B-light"), among the light entered from the illumination optical system 102, and transmits the light in the red wavelength band (hereafter, referred to as "R-light"), and the light in the green wavelength band (hereafter, referred to as "G-light"). A mirror 104 reflects the B-light reflected by the dichroic mirror 103 to a direction to a condenser lens 105.

The condenser lens 105 gives a lens action to the B-light so that the B-light is entered to the display element 106 in a state of parallel light. The display element 106 is driven in response to an image signal for a blue color and modulates the B-light in response to a driven state of the display element 106. A polarization plate (not shown) is disposed at an incident side and emitting side of the display element 106.

A dichroic mirror 107 reflects the G-light only of the R-light and G-light transmitted through the dichroic mirror 103. A condenser lens 108 gives a lens action to the G-light so that the G-light is entered to the display element 109 in a state of parallel light. The display element 109 is driven in response to an image signal for a green color and modulates the G-light in response to a driven state of the display element 109. A polarization plate (not shown) is disposed at an incident side and emitting side of the display element 109.

Relay lenses 110 and 112 give a lens action to the R-light so that an incident state of the R-light with regard to the display element 115 becomes identical with incident states of the B-light and G-light with regard to the display elements 106 and 109. Mirrors 111 and 113 change the optical path of the R-light so as to guide the R-light transmitted through the dichroic mirror 107 to the display element 115.

A condenser lens 114 gives a lens action to the R-light so that the R-light is entered to the display element 115 in a state of parallel light. The display element 115 is driven in response to an image signal for a red color and modulates the R-light in response to a driven state of the display element 115. A polarization plate (not shown) is disposed at an incident side and emitting side of the display element 115.

For the B-light, G-light, and R-light modulated by the display element 106, 109, and 115, a dichroic prism 116 reflects the B-light and R-light, and at the same time, transmits the G-light, thereby performing color synthesis of the B-light, G-light, and R-light. As mentioned above, the color synthesized light (synthesized light) is entered to the projection lens unit 201 in the projection optical system 20. Then, an angle of the synthesized light is widened by the reflection mirror 204, and the synthesized light is projected to the projection plane (screen) via the light beam passing window 206.

As illustrated, the light source 101 is disposed so that a direction of light illumination directs in a direction of the X-axis. With this arrangement of the light source 101, the light source 101 is positioned to illuminate light in the horizontal direction even when the projector is used in any state in use, i.e., used as the ceiling mount type, the stationary type, or the desk mount type. Accordingly, reduction in the service life of the light source 101 due to disposition of the light source 101 in the vertical direction can be suppressed.

Figure 10:
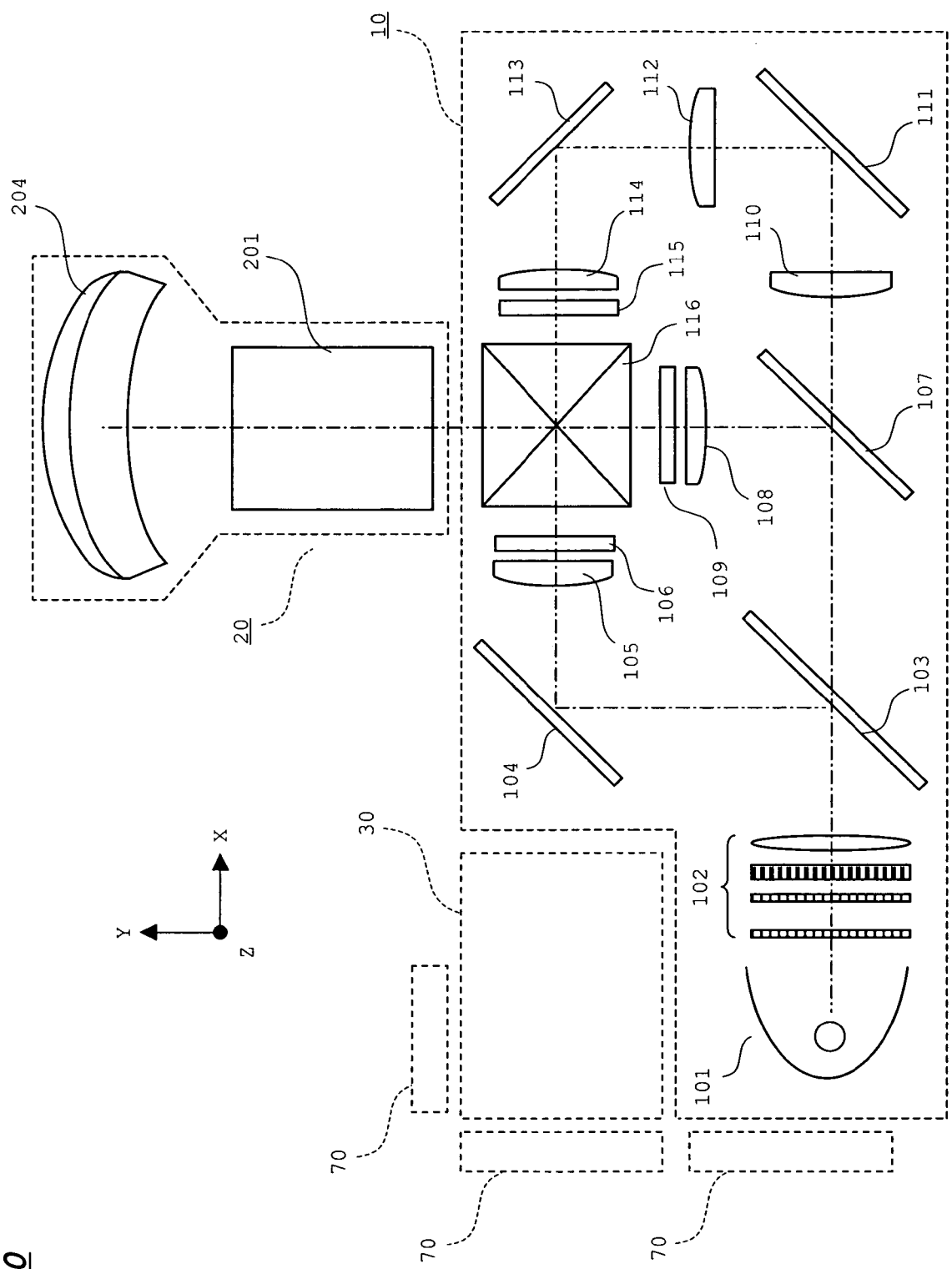
FIG. 10 is a diagram illustrating an arrangement of an optical engine according to the embodiment.

Furthermore, as shown in FIG. 2 and FIG. 10, since the light source 101 is disposed so that the optical axis of the light source 101 may intersect orthogonal to the optical axis of the projection lens unit 201, a dimension of the optical engine 10 in the direction of the optical axis of the projection lens unit 201 can be suppressed. Therefore, a projection distance can be shortened and as a result, a possibility that before reaching the screen, the light emitted from the light beam passing window 206 is blocked by obstacles can be reduced.

The projection optical system 20 comprises the projection lens unit 201 and the reflection mirror 204, and is far heavier than the optical engine 10 (several times heavier). Therefore, according to the present embodiment, the projection optical system 20 is designed to be steadily held so that the cabinet itself holding the projection optical system 20 with a heavy weight may not be caused to deform when an impact is applied to the projection optical system 20.

Hereinafter, the structure for holding the projection optical system 20 in the cabinet will be described referring to FIG. 11 and FIG. 12.

Figure 11:
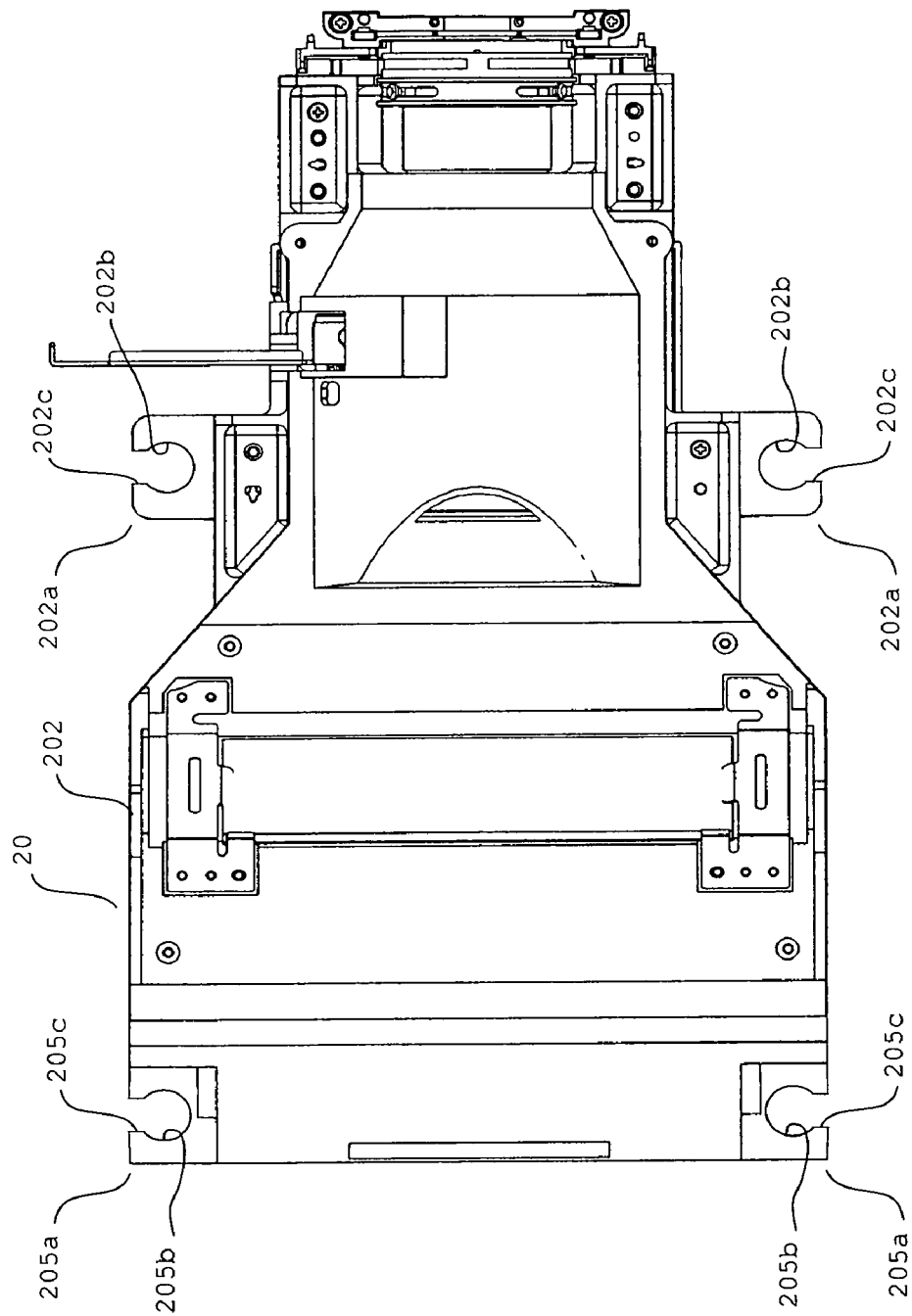
FIG. 11 is a diagram illustrating an arrangement of a plate-like section of the projection optical system according to the embodiment.

FIG. 11 is a top plan view of the projection optical system 20 where a bush 80c is removed.

A plate-like section 202a is provided at both a right side and a left side in an approximately center portion of the housing 202. In the plate-like section 202a are formed a attaching hole 202b into which the bush 80c is inserted and a notch part 202c through which the bush 80c is passed when the bush 80c is inserted into the attaching hole 202b.

In the housing 202 to which a mirror cover 205 is integrated, the plate-like sections 205a are provided at right and left corners of the front side of the housing 202. Similarly, in the plate-like sections 205a are formed the attaching hole 205b into which the bush 80c is inserted and the notch part 205c through which the bush 80c is passed when the bush 80c is inserted into the attaching hole 205b.

Figure 12:
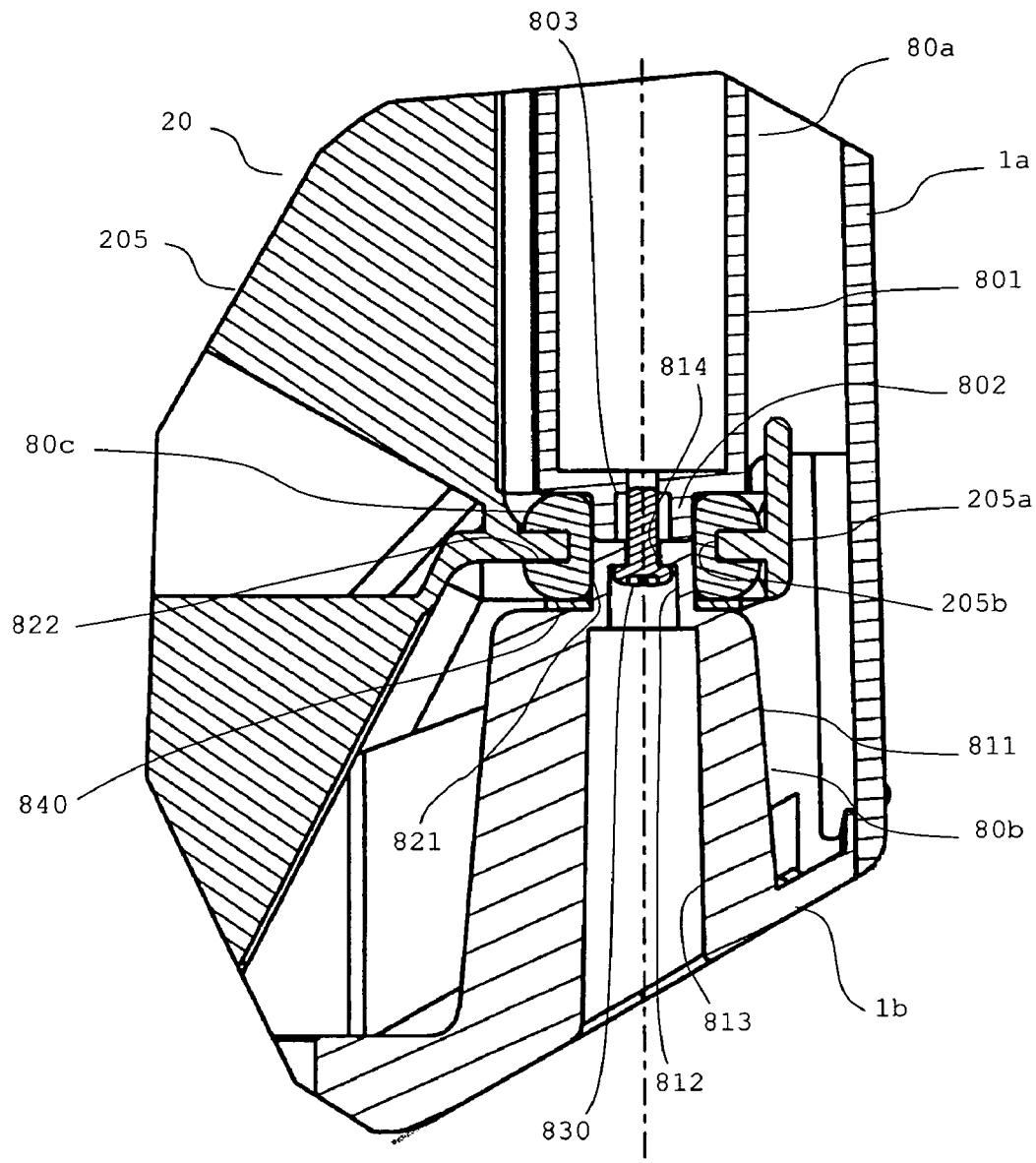
FIG. 12 is a diagram illustrating a structure mounting the projection optical system on the cabinet according to the embodiment.

FIG. 12 is a diagram illustrating the structure for holding the projection optical system 20 to the cabinet. Shown here is a longitudinal sectional view of a main section illustrating the holding part in the plate-like section 205a at the left corner of the housing 202 being cut in a front-back direction. Below, a holding structure of this portion will be described, and the holding structure of the other parts, i.e., the plate-like section 205a at the right corner of the housing 202, the plate-like sections 202a at both the right and left corners in the center portion of the housing 202, have a same structure as that to be described.

Both a top face side cabinet 1a and a bottom face side cabinet 1b constituting the cabinet are made of a synthetic resin. A boss 80a is formed in an integrated fashion with the top face side cabinet 1a, and a boss 80b is formed in an integrated fashion with the bottom face side cabinet 1b.

The boss 80a includes a stanchion part 801 hung from the top face of the top face side cabinet 1a. As shown in FIG. 1, the section of the stanchion part 801 has an approximately U-shaped form. At an end face of the stanchion part 801 is formed a protrusion part 802 having a columnar shape downwardly protruding. A nut 803 is embedded into the protrusion part 802.

The boss 80b includes a stanchion part 811 upwardly protruding from the bottom face of the bottom face side cabinet 1b. At an end face of the stanchion 811 is formed a protrusion part 812 having a columnar shape upwardly protruding. The boss 80b has a structure with an inner portion from the stanchion part 811 to the protrusion part 812 being hollow. This hollow portion extends to an external bottom faces of the bottom face side cabinet 1b and serves as an accommodation depression 813 for accommodating a fixing screw 830 when the boss 80a and boss 80b are coupled. At an end face of the protrusion part 812 is formed a through-hole 814 through which the fixing screw 830 is passed. Furthermore, a washer 840 is disposed at the end face of the stanchion part 811.

The bush 80c is inserted to an attaching hole 205b of the plate-like section 205a. The bush 80c is made of an elastic body such as rubbers and has an approximately doughnut-shape with an insertion hole 821 at the center. A groove 822 is formed around a whole outer circumference of the bush 80c and the groove 822 is engaged with an inner circumferential edge of the attaching hole 205b of the plate-like section 205a. An outer diameter of the protrusion part 802 of the boss 80a and an outer diameter of the protrusion part 812 of the boss 80b are made approximately identical with an inner diameter of the bush 80c.

In this way, at assembly, first, the plate-like section 205a is placed on the boss 80b of the bottom face side cabinet 1b. At this point, the insertion hole 821 of the bush 80c is inserted into the protrusion part 812 of the bush 80b. The bush 80c is placed on the washer 840.

Subsequently, the top face side cabinet 1a is put on the bottom face side cabinet 1b. At this point, the protrusion part 802 of the boss 80a is inserted into the insertion hole 821 of the bush 80c. An end face of the protrusion part 802 and an end face of the protrusion part 812 then abut each other in the insertion hole 821.

Then, the fixing screw 830 is passed from the accommodation depression 813 side through the through-hole 814 of a small diameter part 812, and threaded into the nut 803 of the protrusion part 802. This results in coupling of the boss 80a and the boss 80b. At this point, the bush 80c is sandwiched in a slightly crushed fashion between the end face of the stanchion part 801 of the boss 80a and the end face of the stanchion part 811 of the boss 80b, and the plate-like section 205a is sandwiched via the bush 80c.

In this way, as shown in FIG. 12, the plate-like section 205a is sandwiched between the boss 80a and the boss 80b, thereby fixing the housing 202 to the cabinet. At the same time, the top face side cabinet 1a and the bottom face side cabinet 1b are fixed to each other.

Movement of the housing 202 in right and left directions (direction perpendicular to a direction of sandwiching) is restricted by abutting an inner circumferential wall (equivalent to an abutting face of the present invention) of the insertion hole 821 to the bush 80c and outer circumferential walls (equivalent to an abutted face of the present invention) of the protrusion part 802 and protrusion part 812.

In this way, according to the present embodiment, the projection optical system 20 can be supported by both the boss 80a from the top face side cabinet 1a and the boss 80b from the bottom face side cabinet 1b. Accordingly, the projection optical system 20 is held by the whole cabinet as a three-dimensional structure instead of being held by a way of a planar structure by the bottom face side cabinet 1b only. Therefore, the projection optical system 20 with a heavy weight can be steadily held, and deformation of the cabinet hardly occurs even when an impact is applied to the projection optical system 20.

Furthermore, according to the present embodiment, by the fixing screw 830, the projection optical system 20 can be fixed to the cabinet, and simultaneously, the top face side cabinet 1a can be fixed to the bottom face side cabinet 1b. Accordingly, reduction in the number of the screws can be attained, and at the same time, reduction in assembling man-hours can be attained.

In addition, according to the present embodiment, the projection optical system 20 is held to the cabinet via the bush 80c. Therefore, when a vibration or impact is applied to the cabinet, the vibration or impact can be absorbed by the bush 80c, and the vibration or impact may hardly be conveyed to the projection optical system 20.

The projection optical system 20 is threadably attached to the cabinet together with the optical engine 10 in an integrated fashion. At this point, the optical engine 10 is also attached to the cabinet by screws or the like.

However, when a dimensional error is caused in a position of attaching the projection optical system 20 and optical engine 10 to the cabinet, an unnecessary external force is applied to the unit in which the projection optical system 20 and the optical engine 10 are integrated, thereby leading to geometric distortion in the unit. Misalignment of the optical axis or the like is then caused between the projection optical system 20 and the optical engine 10, and due to this, deterioration of images might occur.

On the other hand, according to the present embodiment, the projection optical system 20 is designed to be attached to the bosses 80a and 80b via the bush 80c, and the above-mentioned dimensional error can then be absorbed within an elastic range of the bush 80c. Accordingly, a positional relationship between the projection optical system 20 and the optical engine 10 can be appropriately maintained, thereby preventing deterioration of the images due to the above-mentioned geometric distortion.

Furthermore, according to the present embodiment, the movement of the projection optical system 20 in the right and left directions (direction perpendicular to the direction of sandwiching) is restricted by abutting the inner circumferential wall of the insertion hole 821 of the bush 80c to the outer circumferential walls of the protrusion part 802 and protrusion part 812, and therefore, the housing 202 (projection optical system 20) can be firmly held for the movement in the right and left directions.

According to the present embodiment, the protrusion parts 802, 812 are provided in both of the bosses 80a and 80b, and the outer circumferential walls of both of these protrusion parts 802 and 812 abut the inner circumferential wall of the insertion hole 821 of the bush 80c. However, without limiting to such a configuration, other configuration may be used in which, for example, no protrusion part is provided in the boss 80a, the protrusion part 812 of the boss 80b is extended to the end face of the stanchion part 802 of the boss 80a so that the inner circumferential wall of the insertion hole 821 of the bush 80c abuts only the outer circumferential wall of the protrusion part 812. In other words, a portion equivalent to the abutted face of the present invention may be provided in either of the boss 80a or boss 80b.

While the embodiment of the present invention has been described as described above, the present invention is not limited by above-mentioned embodiment. It should be understood that various other modifications and variations may be made to the embodiment of the present invention.

What is claimed is:

1. A holding structure for holding a member to be held in an external cabinet having a combination of a first cabinet and a second cabinet, the holding structure comprising:
   a first supporting section provided in the first cabinet;
   a second supporting section provided in the second cabinet; and
   a plate-like section attached to the member to be held, the plate-like section having an attaching hole; and
   an elastic body that is disposed in the attaching hole of the plate-like section, the elastic body having an insertion hole at its center;

wherein the elastic body is sandwiched between an end face of the first supporting section and an end face of the second supporting section, wherein the first supporting section includes a first protruding portion and the second supporting section includes a second protruding portion, the first protruding portion and the second protruding portion extending into the insertion hole of the elastic body such that an end face of the first protruding portion and an end face of the second protruding portion abut each other in the insertion hole, and wherein the plate-like section is sandwiched between the first supporting section and the second supporting section via the elastic body.

2. The holding structure according to claim 1, further comprising a fixture for coupling the first supporting section and the second supporting section, in a state where the plate-like section is sandwiched between the first supporting section and the second supporting section.

3. The holding structure according to claim 1, wherein
a first plane along in a direction of sandwiching is formed to the elastic body,
a second plane facing the first plane when the plate-like section is sandwiched, is formed to at least either of the first supporting section or the second supporting section, and
movement of the member to be held in a direction perpendicular to the direction of sandwiching is restricted by abutting the first plane and the second plane to each other.

4. A projection display device for holding a projection optical system for enlarging and projecting light modulated depending on an image signal on a projection plane in an external cabinet having a combination of a first cabinet and a second cabinet, the projection display device comprising:
a first supporting section provided in the first cabinet;
a second supporting section provided in the second cabinet; and
a plate-like section attached to the projection optical system, the plate-like section including an attaching hole; and
an elastic body that is disposed in the attaching hole of the plate-like section,
wherein the elastic body is sandwiched between an end face of the first supporting section and an end face of the second supporting section, and
wherein the projection optical system is held in the external cabinet by sandwiching the plate-like section between the first supporting section and the second supporting section via the elastic body.

5. The projection display device according to claim 4, further comprising a fixture for coupling the first supporting section and the second supporting section in a state where the plate-like section is sandwiched between the first supporting section and the second supporting section.

6. The projection display device according to claim 4, wherein
a first plane along in a direction of sandwiching is formed to the elastic body,
a second plane facing the first plane when the plate-like section is sandwiched, is formed in at least either of the first supporting section or the second supporting section, and
movement of the projection optical system in a direction perpendicular to the direction of sandwiching is restricted by abutting the first plane and the second plane to each other.

7. A projection display device, comprising:
a projection optical system for enlarging and projecting light modulated depending on an image signal on a projection plane;
a plate-like section attached to the projection optical system, the plate-like section having an attaching hole;
an elastic body that is disposed in the attaching hole of the plate-like section; and
an external cabinet that houses the projection optical system, the external cabinet including a first cabinet and a second cabinet, wherein the first cabinet includes a first supporting section integrally formed with the first cabinet and the second cabinet includes a second supporting section integrally formed with the second cabinet,
wherein the elastic body is sandwiched between an end face of the first supporting section and an end face of the second supporting section, and
wherein the plate-like section is sandwiched between the first supporting section and the second supporting section via the elastic body.

* * * * *